(12) United States Patent
Bayer et al.

(10) Patent No.: US 6,824,211 B2
(45) Date of Patent: Nov. 30, 2004

(54) HEAD RESTRAINT AND METHOD OF MAKING AND USING SAME

(75) Inventors: Franz Josef Bayer, Winnenden (DE); Matthias Nohr, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/912,404

(22) Filed: Jul. 26, 2001

(65) Prior Publication Data

US 2002/0021033 A1 Feb. 21, 2002

(30) Foreign Application Priority Data

Jul. 26, 2000 (DE) .......................................... 100 36 261

(51) Int. Cl.⁷ .............................. B60N 2/42; A47C 1/10; A47C 7/02
(52) U.S. Cl. .............................. 297/216.12; 297/216.1; 297/452.1; 297/391; 297/DIG. 3
(58) Field of Search ........................ 297/216.12, 216.1, 297/452.1, DIG. 3, 391; 29/428; 280/728.1

(56) References Cited

U.S. PATENT DOCUMENTS

| 3,629,882 | A | * | 12/1971 | Thorne ..................... 297/216.1 |
| 3,895,841 | A | * | 7/1975 | Lebert ...................... 297/216.1 |
| 4,890,885 | A | * | 1/1990 | Grossmann ................. 264/222 |
| 5,556,169 | A | * | 9/1996 | Parrish et al. ......... 297/452.28 |
| 5,580,124 | A | * | 12/1996 | Dellanno ................ 297/216.12 |
| 5,806,110 | A | * | 9/1998 | Kunz et al. ............. 297/452.41 |
| 5,902,010 | A | * | 5/1999 | Cuevas ..................... 280/730.1 |
| 5,975,629 | A | * | 11/1999 | Lorbiecki ............... 137/625.46 |
| 5,975,637 | A | | 11/1999 | Geuss et al. |
| 6,088,640 | A | * | 7/2000 | Breed .......................... 280/735 |
| 6,402,238 | B1 | | 6/2002 | Bigi et al. ............. 297/216.12 |

FOREIGN PATENT DOCUMENTS

| DE | 3900405 A1 | 7/1990 |
| DE | 3900495 | 7/1990 |
| DE | 29710511 U1 | 11/1997 |
| DE | 19714857 A1 | 10/1998 |
| EP | 0925997 | 10/1998 |
| EP | 0925997 A2 | 6/1999 |
| GB | 2344514 A | 6/2000 |
| WO | WO-00/21417 A1 | 4/2000 |

OTHER PUBLICATIONS

European Search Report Mailed Dec. 16, 2003.

* cited by examiner

*Primary Examiner*—Lanna Mai
*Assistant Examiner*—Sarah C. Burnham
(74) *Attorney, Agent, or Firm*—Crowell & Moring LLP

(57) ABSTRACT

A head restraint of a vehicle seat has at least one elastically deformable container integrated therein. The container is at least partially filled with filling bodies and gas. An abrupt evacuation of the gas in the event of a crash changes the collision impact characteristics of the head restraint.

20 Claims, 3 Drawing Sheets

HEAD RESTRAINT AND METHOD OF MAKING AND USING SAME

This application claims the priority of German Patent Document 100 36 261.3, filed in Germany, Jul. 26, 2000, the disclosure of which is expressly incorporated by reference herein.

BACKGROUND AND SUMMARY OF THE INVENTION

The invention relates to a head restraint of a vehicle seat, which is used as an energy absorber and whose absorption capacity can be influenced abruptly during an accident, in particular a rear-end accident. The invention also relates to a method of using the head rest and to a method of making the headrest.

The head restraints arranged on the vehicle seats have the task of intercepting the head of the vehicle occupants if, as a consequence of a rear-end impact, the head is flung rearwards. As this happens, the head covers a distance relative to the spinal column of the body, which distance can differ in length depending on the setting of the head restraint relative to the seat position of the vehicle occupants. It is clear that the risk of serious injuries in the region of the cervical spine is all the more pronounced the greater the distance to be covered by the head during the accident on account of the relative movement and the greater the difference between the movement of the body and of the head.

This risk is counteracted in the prior art by a series of solutions.

For example, German Published Patent Application DE 39 00 495 A1 discloses an arrangement in which a padded element is integrated into the head restraint, the padded element being driven either by a spring or pyrotechnically when a sensor emits a corresponding triggering signal when an accident occurs. The padded element then extends in the direction of the vehicle occupant's head in order to reduce to the greatest possible extent the possible distance to be covered and thereby to support the back of the head.

Furthermore, European Published Patent Application EP 0 925 997 A2 discloses a head restraint which is moved forwards in the event of a rear-end impact in order to intercept the vehicle occupant's head which is flung rearwards. To this end, at least one reservoir, which is filled with a flowable medium and is connected to a fillable element which is arranged in the head restraint, is arranged in the backrest of a vehicle seat, with the result that, in the event of a rear-end impact and as a function of the severity thereof, the flowable medium is displaced upwards by the upper part of the vehicle occupant's body into the element of the head restraint, which then in consequence moves forwards in the direction of the occupant's head.

Furthermore, German Patent Publication DE 297 10 511 U1 discloses a further solution in which a gas generator, which may optionally be arranged in the backrest of the vehicle seat, can act upon a corresponding gas bag, which is arranged in the head restraint, with a certain internal pressure, as a function of the impact intensity, in order to counteract the abovementioned risk of injury.

An object of the present invention is to provide a head restraint which, in comparison with the solutions from the prior art, offers improved absorption properties and whose use can be reversibly repeated as often as desired.

Furthermore, an object of the invention is to provide a head restraint which can be adapted individually, at all times in a repeatable and changeable manner, to the anatomical head shape of each individual vehicle occupant, with the result that it deploys optimum protective effects and is able to stabilize the head of the vehicle occupants, in particular during a rear-end impact.

According to the invention, these and other objects are achieved in that at least one container is integrated in the head restraint, the container being elastically deformable and being filled with filling bodies and being connected to means for the abrupt evacuation of the gas which is in it, by the formation of a negative pressure or vacuum.

The application of negative pressure means that a head restraint is available as a hard energy absorber having good absorption properties. At the same time, the vacuum ensures that the flexible covering of the container retains its shape even when subjected to a shock-like stress, as occurs through the impact of the head.

In an advantageous embodiment of the invention, the head restraint is coupled to a valve device which ensures that either negative pressure or ambient pressure prevails in the interior of the container. In the normal state, the interior of the container is acted upon by ambient pressure, so that the filling bodies which are situated in the container are loose and not tightly packed. This ensures a very soft dimensional flexibility of the head restraint which, moreover, can be set and adapted individually by the different degree of filling and different filling material.

In critical situations, however, it is not such a claim of comfort which is significant, but rather an efficient as possible energy absorption capacity of the head restraint. In the event of a rear-end impact, the interior of the container is abruptly acted upon by negative pressure or by a virtual vacuum, so that the filling bodies as a whole are compressed, in which case the elastic covering of the container is placed tightly against the filling bodies and the head restraint thereby becomes harder overall. The impacting head is therefore intercepted earlier, since it is no longer able to plunge into the head restraint and is therefore accelerated to a less severe extent in its rearwardly directed tilting movement.

The level of vacuum necessary depends on the specific design of the necessary hardness of the compacted container and ultimately on the material used for the filling bodies. In this connection, the ranges for the negative pressure or the virtual vacuum can lie within a range of about 30–700 mbar.

If a critical situation does not lead to the head impacting against the head restraint or against the container integrated therein, or the impact does not lead to a reversible changing of the container itself, then the latter may be refilled with air or acted upon by ambient pressure, with the result that the container does not become unusable and would have to be exchanged.

According to preferred embodiments of the invention, different principles and means can be used for generating the vacuum or negative pressure in the container. The means used can include vacuum pumps, optionally with vacuum reservoir containers coupled to them, and also overpressure containers using the Venturi principle or similar principles. The respective pressure states between the container and the vacuum-generating means can be maintained via a valve device.

Certain preferred embodiments of the invention are distinguished in that the means are coupled to a pre-crash sensory mechanism which triggers the respective negative-pressure or vacuum state only in extreme situations, as in particular in the case of a rear-end impact. In this case, it is possible to make recourse to a pre-crash sensory mechanism which is available in the vehicle and is already used for other active safety measures in the motor vehicle.

The head restraint according to certain preferred embodiments of the invention has a multiplicity of variables which permit, both individually and in each case independently of one another, and also in their entirety in concerted coordination with one another, individual adaptation both to the anatomical actuality of the vehicle occupant and also to the absorption properties required in the course of a rear-end accident.

The elasticity of the filling bodies which are used can therefore be selected as desired in accordance with the diversity of materials provided commercially. For example, the use of a jelly-like material which, in the event of a shock-like stress, collapses into itself and thereby makes available a path of deformation, is advantageous.

However, non-deformable, i.e., non-energy-absorbing materials, can be used as filling bodies, such as particular bulk material in the form of sand or powdery materials. The incompressible grains of sand result in the energy absorber in the form of the container functioning reversibly if the covering is not damaged.

Further examples of filling material which can be used include polypropylene in the form of spheres of differing density, or else wood dust or hollow glass spheres.

Further coordination can be obtained by differing the degree of filling of the container according to certain preferred embodiments of the invention. In further preferred embodiments, the gas-tight, elastic container is divided into a plurality of chambers, in which case the outer shape of the chambers and of the container, their size and the overall volume can be of different design for the purpose of optimum adaptation to the shape of the head restraint.

Strip-shaped, band-shaped, plate-shaped, round and angular chambers which are at least partially gas- and pressure-conductively connected to one another are provided according to certain preferred embodiments of the invention. Alternatively, the chambers are also completely sealed hermetically with respect to one another and each have a separate duct to the vacuum sources.

The container of certain preferred embodiments preferably comprises two films, one shaping film and one planar film, which can be adapted by means of thermoforming of the geometry of the head restraint. The films are welded or bonded to one another, in which case a connection for removing and filling with air is welded or bonded in at the same time. Polyurethane is preferably used here as the material for the films.

Other objects, advantages and novel features of the present invention will become apparent from the following detailed description of the invention when considered in conjunction with the accompanying drawings.

DETAILED DESCRIPTION OF THE DRAWINGS

Figure 1:
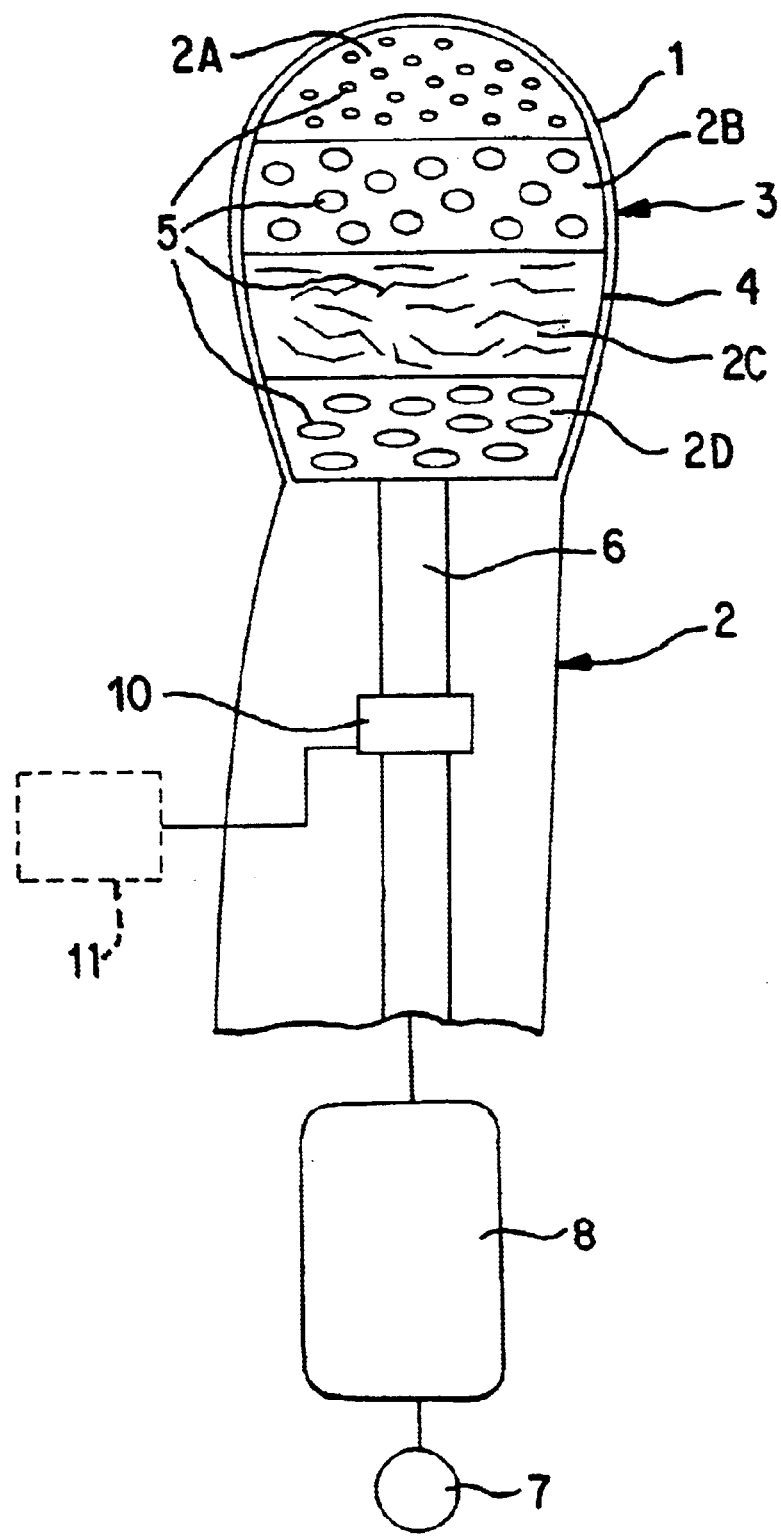
FIG. 1 shows a highly schematic cross section through a head restraint of a vehicle seat according to preferred embodiments of the invention, shown in a normal state.

FIG. 1 shows a head restraint 1 which is integrated here into a backrest of a vehicle seat 2. Of course, however, embodiments of the invention are contemplated which relate to head restraints which constitute a separate component from the backrest.

A virtually shape-equivalent container 3 which has an elastically deformable covering 4 is arranged in the head restraint 1. Filling bodies 5 are enclosed in the covering, the filling material 5 not being tightly packed in the normal state and permitting soft and comfortable formation of the head restraint 1.

Figure 2:
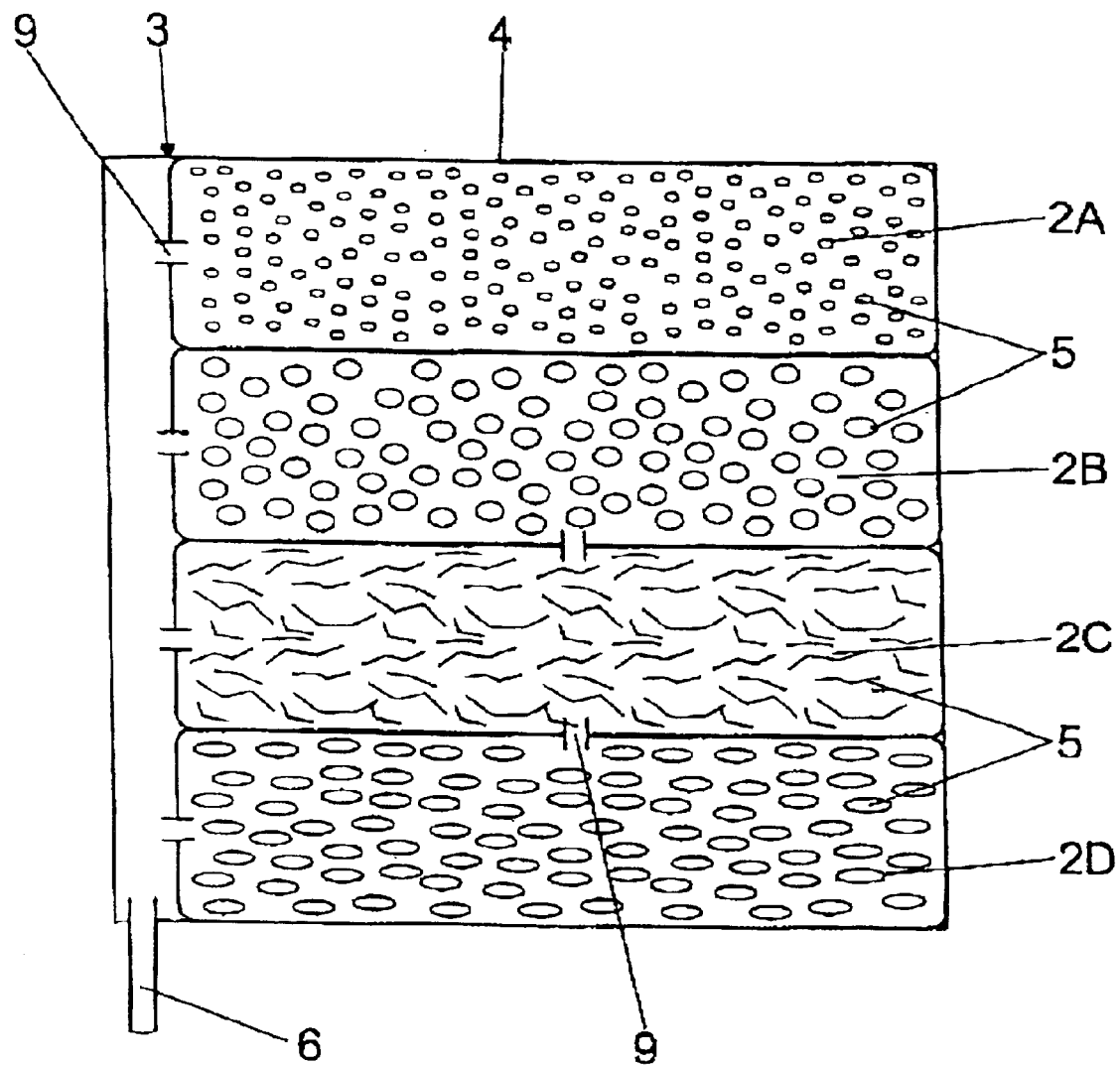
FIG. 2 shows a schematic illustration of an exemplary embodiment of a container which is arranged in the head restraint according to the invention and is equipped with chambers which differ in filling and design.

As can also be gathered from FIG. 2, the filling bodies 5 are arranged in the container 3 in different chambers 2A, 2B, 2C, 2D, which in each case constitute a type of inlay bag, in order to prevent the filling material from slumping and to ensure a uniform distribution of the filling bodies 5, which are composed here of different materials. The bag-like chambers 2A, 2B, 2C and 2D are selected with regard to their material in such a manner that filling material is unable to escape in the event of a gas evacuation, which is described in greater detail below.

The container 3 is connected via a duct 6 to a valve device 10, a vacuum pump 7 and a vacuum reservoir container 8, via which, if a crash event is recognized by means of a customary pre-crash sensory mechanism 11, a negative pressure or vacuum can be abruptly generated in the container 3 in order to stiffen and compact the filling bodies 5 in the container 3. In this case, the triggering of the crash signal causes the valve device 10 to switch over and the gas which is in the container 3 to be conveyed via the duct 6, which preferably has the largest possible duct cross section in order to rapidly obtain a vacuum, into the vacuum reservoir container 8 which, in the design shown, is integrated within the vehicle seat 2, namely in the region of the backrest of the vehicle seat.

However, in another embodiment of the invention, the vacuum reservoir container 8 can also be arranged integrated on the lower side of the vehicle seat 2.

Figure 3:
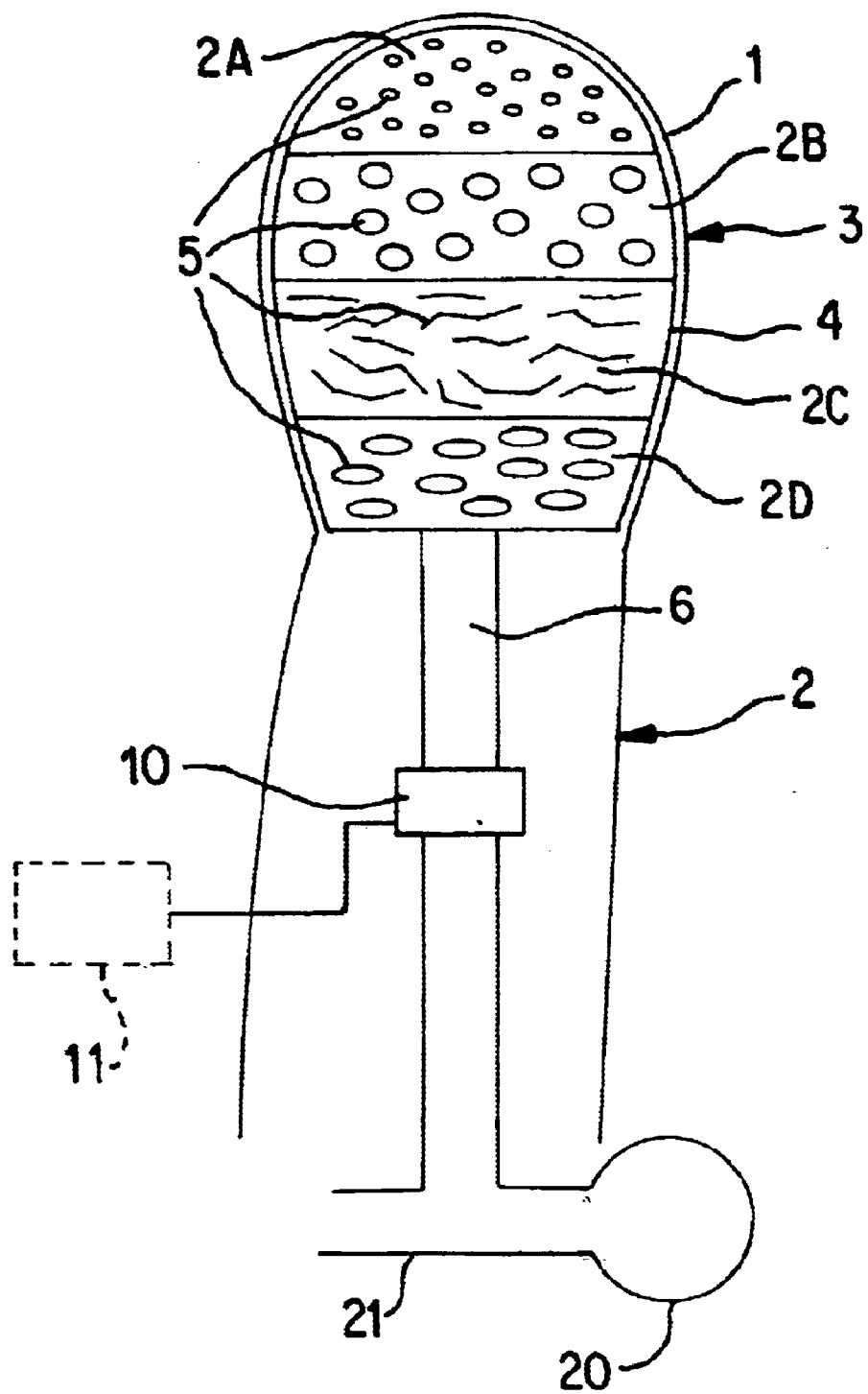
FIG. 3 shows an embodiment utilizing the Venturi principle.

A separate pump or else even a pump which is already present, for example, a series pump for a central locking system of the vehicle, can be used as the vacuum pump 7. If the vacuum pump 7 is combined with the vacuum reservoir container 8, the vacuum pump 7 can be of comparatively small design, in which case the vacuum pump can be switched off after the appropriate pressure level has been reached in the container 3. An overpressure container 20, as shown in Figure 3, using a Venturi principle via a Venturi nozzle 21, can be used to generate the vacuum or negative pressure in the container.

As a consequence of the generation of negative pressure or a vacuum in the container 3, the entire head restraint 1 in the present case becomes more compact in order to absorb energy and support the head, but provision may, for example, also be made for the vacuum to be generated only in part of the space, so that, for example, an inner region of the head restraint becomes more compact and a soft ring remains surrounding it.

The chambers 2A, 2B, 2C and 2D are, as can be gathered in particular from FIG. 2, connected gas- and pressure-conductively to one another via corresponding openings or ducts 9, but they may, of course, also be separated from one another in a hermetically sealed manner and each connected to the duct 6 for setting the appropriate state of pressure.

The chambers 2A, 2B, 2C and 2D which are shown by way of example in FIG. 2 indicate that filling bodies 5 which differ in each case therein can be provided with a different degree. of filling, and that the number of the individual chambers, their geometrical shape, the connection of the chambers to one another and the type of filling can be coordinated at any time individually to the given requirements, so that in conjunction with the application of the negative pressure for the event of a crash, for example in the case of a rear-end impact, the best absorption properties in each case can be obtained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Head restraint of a vehicle seat, in which at least one container having an elastically deformable, gas tight covering is integrated, said container being filled with a gas and at least partially with filling bodies and being provided with at least one duct which is connected to an evacuator assembly for an abrupt evacuation of the gas in the event of a crash and for refilling of the gas, a vacuum being applied automatically in the event of said crash, wherein the at least one duct is connected to a vacuum reservoir container of the evacuator assembly.

2. Head restraint according to claim 1,
wherein the evacuator assembly is activated by a pre-crash sensory mechanism.

3. Head restraint according to claim 1,
wherein the evacuator assembly for an abrupt evacuation of the gas in the event of a crash and for refilling of the gas is integrated below or within the vehicle seat.

4. Head restraint according to claim 1,
wherein the container is divided into a plurality of chambers which are at least partially filled with the filling bodies.

5. Head restraint according to claim 4,
wherein the chambers are designed being one of hermetically sealed with respect to one another and at least partially gas-conductively connected to one another.

6. Head restraint according to claim 1,
wherein the filling bodies consist of different materials.

7. Head restraint according to claim 6,
wherein the materials for the filling bodies comprise deformable and non-deformable materials.

8. Head restraint according to claim 1,
wherein the duct has at least one valve device of the evacuator assembly located therein.

9. Head restraint according to claim 1,
wherein the duct is connected to a vacuum pump of the evacuator assembly.

10. Head restraint according to claim 9,
wherein a pump for a central locking system in the vehicle can be used as the vacuum pump.

11. Head restraint according to claim 1,
wherein the duct is connected to a vacuum reservoir container of the evacuator assembly.

12. Head restraint according to claim 1,
wherein the duct is connected to an overpressure container.

13. Head restraint according to claim 1,
wherein the duct has a Venturi nozzle.

14. A vehicle head restraint assembly comprising:
at least one container with an elastically deformable covering,
gas and filling bodies in the at least one container,
a duct connected to the at least one container, and
an evacuator operable in use to evacuate the gas from the at least one container through the duct, a vacuum being applied automatically to the container in the event of a crash, wherein the duct is connected to the evacuator via a vacuum reservoir container.

15. A vehicle head restraint assembly according to claim 14, further comprising a pre-crash sensing mechanism operable to activate the evacuator in response to a predetermined crash event involving a vehicle including said head restraint assembly.

16. A vehicle head restraint assembly according to claim 14, comprising a plurality of said containers together forming a head restraint.

17. A vehicle passenger seat assembly comprising:
a backrest,
a headrest composed of at least one container with an elastically deformable covering,
gas and filling bodies in the at least one container,
a duct connected to the container, and
an evacuator operable in use to evacuate the gas from the at least one container through the duct, wherein the duct is connected to the evacuator via a vacuum reservoir container, and
wherein said evacuator is disposed at least in part in said backrest, a vacuuming being applied automatically to the container in the event of a crash.

18. A vehicle passenger seat assembly according to claim 17, further comprising a pre-crash sensing mechanism operable to activate the evacuator in response to a predetermined crash event involving a vehicle including said head restraint assembly.

19. A method of making a vehicle head restraint assembly, comprising:
connecting a plurality of containers together, which said containers each include an elastically deformable covering, filling at least one of the containers with gas and filling bodies, attaching a duct to communicate with an interior space of the at least one of the containers, and providing an evacuator operable to evacuate gas from the at least one of the containers through the duct automatically in the event of a crash, wherein the duct is connected to the evacuator via a vacuum reservoir container.

20. A method of operating a vehicle head restraint assembly which includes:

at least one container with an elastically deformable covering, gas and filling bodies in the at least one container, a duct connected to the at least one container, said method comprising evacuating gas from the at least one container through said duct via a vacuum reservoir container automatically in response to detection of a vehicle crash condition.

* * * * *